(12) United States Patent
Mähl

(10) Patent No.: US 11,388,898 B2
(45) Date of Patent: Jul. 19, 2022

(54) STUD HOLE PROTECTION FOR A HORSESHOE

(71) Applicant: Malma Dental AB, Malmkoping (SE)

(72) Inventor: Thomas Mähl, Malmkoping (SE)

(73) Assignee: Malma Dental AB, Malmkoping (SE)

( * ) Notice: Subject to any disclaimer, the term of this patent is extended or adjusted under 35 U.S.C. 154(b) by 184 days.

(21) Appl. No.: 16/079,157

(22) PCT Filed: Feb. 22, 2017

(86) PCT No.: PCT/SE2017/050168
§ 371 (c)(1),
(2) Date: Aug. 23, 2018

(87) PCT Pub. No.: WO2017/151037
PCT Pub. Date: Sep. 8, 2017

(65) Prior Publication Data
US 2019/0045770 A1 Feb. 14, 2019

(30) Foreign Application Priority Data
Feb. 29, 2016 (SE) .................................. 1650259-3

(51) Int. Cl.
*A01L 7/06* (2006.01)
*A01L 7/00* (2006.01)
(Continued)

(52) U.S. Cl.
CPC .................... *A01L 7/00* (2013.01); *A01L 7/04* (2013.01); *A01L 7/06* (2013.01); *F16B 33/004* (2013.01)

(58) Field of Classification Search
CPC ..... A01L 7/00; A01L 7/04; A01L 7/06; A43C 13/04; A43C 15/16; A43C 15/161; A43C 15/162; A43C 15/167; A43C 15/168
(Continued)

(56) References Cited

U.S. PATENT DOCUMENTS 1,361,744 A 12/1920 Porter
1,508,129 A * 9/1924 Sanders .................... A01L 7/06
 168/42

(Continued)

FOREIGN PATENT DOCUMENTS

DE 2651660 A1 5/1978
DE 4418169 A1 11/1995
(Continued)

OTHER PUBLICATIONS

International Search Report and Written Opinion regarding Int'l. Appl. No. PCT/SE2017/050168, dated May 22, 2017, 10 pps.
(Continued)

*Primary Examiner* — Son T Nguyen
(74) *Attorney, Agent, or Firm* — Foley & Lardner LLP

(57) ABSTRACT

Stud hole protection (13, 60), to be inserted into a threaded stud hole (12) in a horseshoe (10). The stud hole protection (13, 60) comprises a stud hole core (21, 81). The peripheral parts of the stud hole core (21, 81) are at least partly provided with a thread connection element (23, 62) of a softer material than the material of the stud hole core (21, 81) and which thread connection element (23, 62) connects to the thread (51) of the stud hole (12) in the horseshoe (10) when the stud hole protection (13, 60) is mounted.

15 Claims, 3 Drawing Sheets

(51) Int. Cl.
    *A01L 7/04* (2006.01)
    *F16B 33/00* (2006.01)

(58) Field of Classification Search
    USPC .................................................. 168/23, 42
    See application file for complete search history.

(56) References Cited

U.S. PATENT DOCUMENTS

| | | | | |
|---|---|---|---|---|
| 2,049,544 | A | * | 8/1936 | Mucklich ................. A01L 7/06 168/42 |
| 2,137,062 | A | * | 11/1938 | Raz-Ammann ........... A01L 7/04 168/29 |
| 2,381,177 | A | * | 8/1945 | Mitchell .................... A01L 7/04 168/33 |
| 4,791,692 | A | * | 12/1988 | Collins ................ A43C 15/161 12/142 P |
| 5,732,482 | A | * | 3/1998 | Remington ............. A43C 15/14 36/127 |
| 2008/0115946 | A1 | * | 5/2008 | Baruffolo ................. A01L 7/04 168/42 |
| 2009/0044959 | A1 | * | 2/2009 | Mastice .................... A01L 7/04 168/11 |
| 2009/0084560 | A1 | * | 4/2009 | Spooner .................... A01L 7/04 168/31 |

FOREIGN PATENT DOCUMENTS

| | | | | |
|---|---|---|---|---|
| DE | 20 2004 010 771 U1 | | 9/2004 | |
| DE | 20 2007 001 379 U1 | | 5/2007 | |
| DE | 102006039441 A1 | * | 2/2008 | ............... A01L 5/00 |
| DE | 202008007406 U1 | | 8/2008 | |
| EP | 1992223 A1 | * | 11/2008 | ............... A01L 7/04 |
| FR | 2612048 A1 | | 9/1988 | |
| GB | 2451112 A | * | 1/2009 | ............... A01L 7/04 |
| GB | 2465635 A | | 6/2010 | |
| GB | 2561670 A | * | 10/2018 | ............... A01L 7/04 |
| WO | WO-2005082193 A1 | * | 9/2005 | ............... A01L 7/04 |
| WO | WO 2012/160260 A1 | | 11/2012 | |
| WO | WO-2012/160260 A1 | | 11/2012 | |

OTHER PUBLICATIONS

European Extended Search Report for Application No. 17760393.3 dated Oct. 2, 2019, 7 pps.

Communication from the European Patent Office regarding Appl. No. 17760393.3, dated Jun. 30, 2020, 6 pps.

* cited by examiner

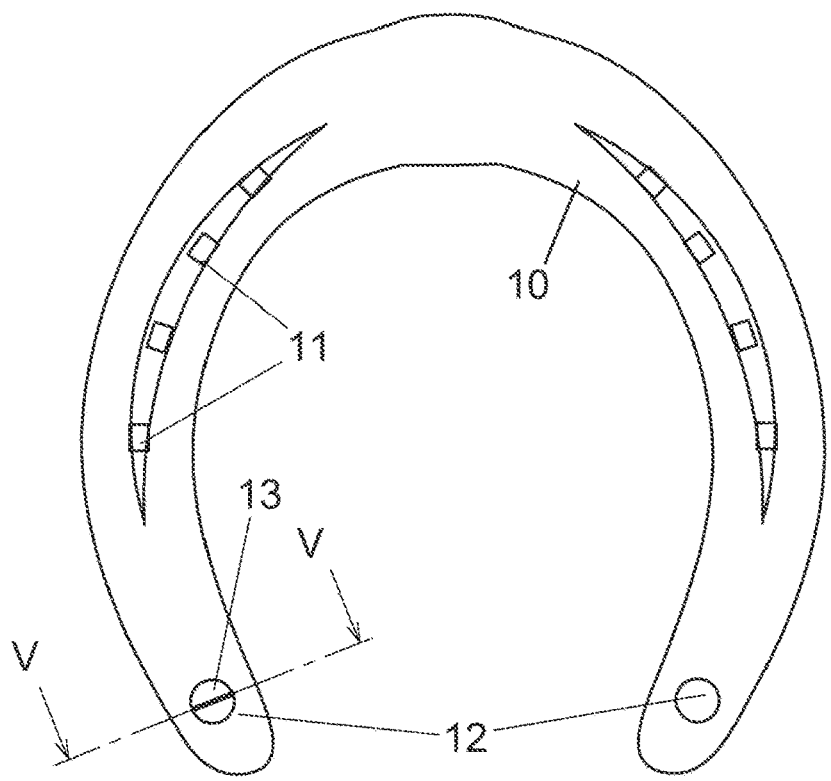
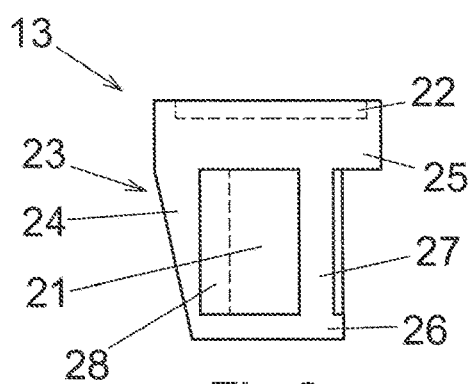
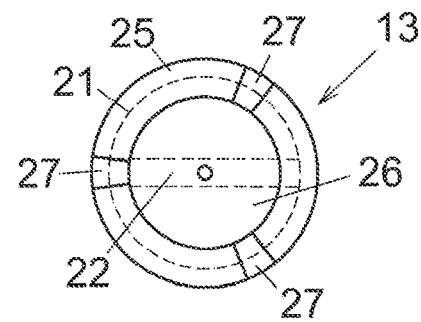
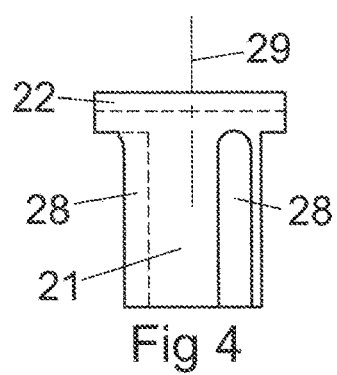
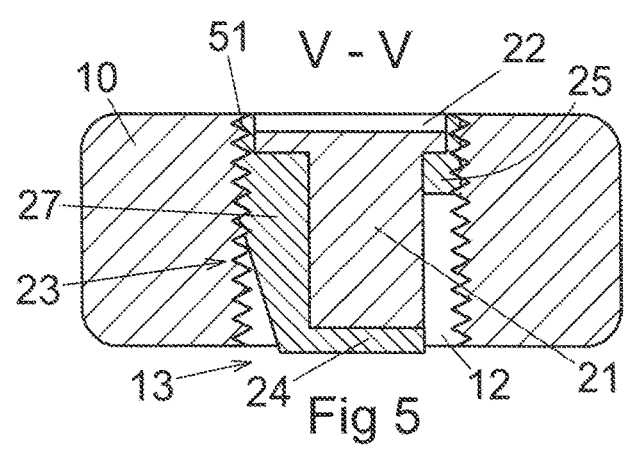

STUD HOLE PROTECTION FOR A HORSESHOE

TECHNICAL FIELD

The present invention relates to a horseshoe and particularly a horseshoe that is provided with detachable studs.

BACKGROUND OF THE INVENTION

On slippery ground, horseshoes having studs are used. Said studs may be integrated with the horseshoe wherein the entire horseshoe has to be replaced when the studs are to be removed. In addition, there are horseshoes having threaded holes for detachable studs. Problems of said horseshoes are that the threaded holes are difficult to keep intact when studs are not fitted. Dirt is collected in the threads of the holes, which are difficult to clean before the studs should be fitted. An even greater problem is that load of several hundred kilos against a threaded hole because of stone and the like will deform the threads and makes it impossible that a stud can be fitted in the thread.

From the English document GB 2465635 it is known that a horseshoe of steel is provided with threaded holes to allow the fitting of studs. The document also shows that this threaded hole is protected by a foam plug having a high density and high proportion of closed cells of a material that resists wearing, fluid absorption and hydrolysis. A problem is, however, that the threads risk being deformed upon heavy load against the plug since the foam plug is pressed into the threaded hole wherein a metal stud cannot be screwed-in. In addition, dirt is pressed up and into the threaded holes.

The French document FR 2612048 shows a threaded protective plug of nylon or plastic to protect a threaded hole in a horseshoe in which a stud can be fitted by removing the plug and replacing the same by the stud. The plug is provided with a screw driver slot to easily be removable by a screwdriver. The problem of this protective plug is that the threads both on the plug and in the horseshoe are deformed upon heavy load against the plug wherein the same cannot be removed to replace a stud. Even if the plug can be removed, the thread in the horseshoe will probably be deformed. Also in this type of protective plug, dirt is pressed up and into the threaded holes, which causes difficulties of removing the plug and screw in a stud.

By the German document DE 202008007406 U1, a threaded sealing element for a horseshoe of metal is previously known. The sealing element is provided with a groove in which a clamping element in the form of an elastic sealing ring is inserted to avoid an unintentional locking of the sealing element. The object of said sealing ring is to prevent dirt from penetrating into the threads and hindering the sealing element from being removed and replaced by a stud. However, there are problems of this design by the fact that heavy load against the sealing element means that the threads are deformed and the sealing element cannot be removed in spite of the fitted sealing ring.

THE OBJECT OF THE INVENTION

The object of the present invention is to provide a stud hole protection which minimizes the problems indicated above of previously known solutions for a protection for a stud hole in a horseshoe.

The object is furthermore to provide a stud hole protection which is soft and protecting against the threads of the horseshoe and which simultaneously is sufficiently staying so that the protection will retain its basic shape upon load.

SUMMARY OF THE INVENTION

By the present invention, such as this is seen in the independent claims, the above-mentioned objects are met, wherein said disadvantages have been eliminated. Suitable embodiments of the invention are defined in the dependent claims.

The invention concerns a stud hole protection, intended to be inserted into a threaded stud hole in a horseshoe. The stud hole protection comprises a stud hole core. This may be entirely cylindrical or slightly conical. The peripheral parts of the stud hole core are provided with a thread connection element of a softer material than the material of the stud hole core. The thread connection element connects to the thread of the stud hole when the stud hole protection is mounted. Thus, the stud hole protection consists of a plug consisting of a relatively hard core combined with a softer externally placed material wherein this material is threaded into the threads of the horseshoe. For screwing and unscrewing of the stud hole protection, this is provided with a screw driver slot or another recess for an adapted tool, for instance a hex head or torx wrench. The externally placed material may be integrated with the core, be countersunk in the core, or be exterior the core.

In one embodiment of the invention, the stud hole core is essentially cylindrical.

In one embodiment of the invention, the stud hole core is of metal, preferably steel. Also other metals may be used, for instance copper or aluminium.

In one embodiment of the invention, the thread connection element is of a polymeric material, such as, for instance, rubber or plastic. The thread connection element is placed externally of the stud hole core to distance the thread of the horseshoe from the stud hole core and allow the thread of the horseshoe to penetrate into the softer rubber or plastic material.

In one embodiment, the stud hole core is provided with gripping means, which act clamping against the thread connection element. Said gripping means may be formed as grooves or recesses in the stud hole core and aim at acting conveyingly on the externally situated thread connection elements.

In one embodiment of the invention, the thread connection element is formed as a connector basket having a top ring, which is connected to a bottom slab by a number of connecting elements. Between the top ring and the bottom slab, the connecting elements are running along the surface of the stud hole core. The connecting elements may either be recessed in the surface of the core or be exterior.

In one embodiment of the invention, the stud hole core is provided with grooves in which the connecting elements partly are inserted, so that the grooves should act conveyingly on the connector basket upon mounting by screwing-in the stud hole protection. Thus, in this embodiment the connecting elements are recessed in the surface of the core.

In one embodiment of the invention, the number of connecting elements is three. Also embodiments having four connecting elements may be conceivable within the scope of the invention.

In one embodiment of the invention, the thread connection element is formed as an encasing jacket having integrated wings. The number of wings may be three, four, or five.

In one embodiment of the invention, the stud hole core is plate-shaped with edge-positioned recesses. The recesses aim at retaining the encasing jacket upon load. In such an embodiment, the plate of the stud hole core and/or may be provided with holes to accommodate the encasing/embedded jacket.

In one embodiment of the invention, the number of thread connection elements is three. Preferably, the same are equidistantly placed.

In other embodiments of the invention having another number of thread connection elements, these are equidistantly placed.

In one embodiment of the invention, the thread connection element is formed as a jacket encasing a stud hole core. This encasement may be total so that no contact between stud hole core and horseshoe can occur.

In one embodiment of the invention, the stud hole core is provided with three to five plate-shaped wings which are directed radially out from the centre axis of the stud hole core and have edge-positioned recesses, preferably in the form of four core wings. The wings are placed at the same peripheral distance to each other to obtain the best possible pressure distribution in the stud hole protection.

In one embodiment of the invention, each plate-shaped wing is provided with only one edge-positioned recess even if several recesses may be present on each wing.

In one embodiment of the invention, at least two of the edge-positioned recesses are situated at equal axial distance from the bottom of the stud hole core. In the most preferred embodiment, all edge-positioned recesses are situated at equal axial distance from the bottom of the stud hole core.

BRIEF DESCRIPTION OF THE DRAWINGS

Now, the invention will be described in more detail, references being made in connection with the accompanying drawing figures. The drawing figures show only explanatory sketches intended to facilitate the understanding of the invention.

FIG. 1 shows a horseshoe having a stud hole protection according to a first embodiment of the invention.

FIG. 2 shows the stud hole protection according to FIG. 1 from the side.

FIG. 3 shows the stud hole protection according to FIG. 1 from the under side.

FIG. 4 shows the stud hole core of the stud hole protection.

FIG. 5 shows a schematic section V-V in enlargement according to FIG. 1 through the horseshoe with the stud hole protection thereof.

DESCRIPTION OF THE INVENTION

Figure 6:
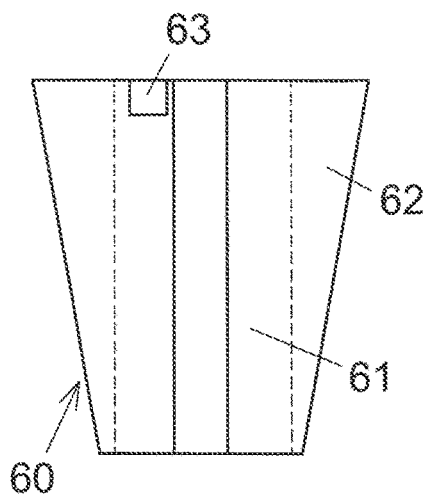
FIG. 6 shows a side view of a second embodiment of a stud hole protection according to the invention.

FIG. 1 shows a horseshoe 10, which is provided with a number of holes for horseshoe nail 11 and two threaded stud holes 12 for the fitting of studs. In one of the threaded holes 12, a stud hole protection 13 is screwed-in to protect the threads when the horseshoe is used without stud.

FIG. 2 shows a first embodiment of the complete stud hole protection 13. The stud hole protection consists of a stud hole core 21 provided with a screw driver slot 22, which is indicated by a dashed line in the figure, the purpose of which screw driver slot 22 is to be able to screw in and unscrew the same from the horseshoe.

The figure shows a thread connection element 23 placed on the outside of the stud hole core 21. In the embodiment illustrated, the thread connection element 23 is formed as a connector basket 24 having a top ring 25 connected to a bottom slab 26 by a number of connecting elements 27. The top ring 25 according to the figure extends to the same level as the stud hole core, but in other feasible embodiments, the top ring may extend beyond the level of the stud hole core to eliminate break-through of the stud hole core against a co-operating thread. Each connecting element 27 is recessed in a groove 28 indicated by a dashed line in the figure. The connector basket 24 according to the embodiment shown is provided with three connecting elements 27, which are parallel to each other and connected at right angles to the top ring 25 as well as to the bottom slab 26.

FIG. 3 shows the stud hole protection 13 from the under side. The three connecting elements 27 extend between the bottom slab 26 and the top ring 25. The dashed circle in the figure implies the greatest extension of the stud hole core 21, i.e., the diameter where the screw driver slot is situated. Also the screw driver slot 22 is indicated in the figure.

FIG. 4 shows the cylindrical stud hole core 21 when the connector basket has been removed. The stud hole core 21 is provided with three grooves 28, two of which can be identified in the figure while the third is hidden. The grooves 28 are placed on the periphery of the stud hole core 21 and are oriented parallel to the symmetry axis 29 of the stud hole core 21. Also the screw driver slot 22 has been indicated by a dashed line.

FIG. 5 shows a section V-V according to FIG. 1 through a horseshoe 10, which is provided with a stud hole protection 13 according to the embodiment in FIGS. 1-4. The horseshoe 10 is provided with stud holes 12, each one of which is provided with a stud hole thread 51. The stud hole protection 13, with the stud hole core 21 and the connector basket 24, has, by means of a screwdriver, via the screw driver slot 22, been screwed into the stud hole thread 51, wherein the horseshoe 10 only is in contact with the connector basket 24 of the thread connection element 23 and particularly the top ring 25 thereof and the connecting elements 27 thereof.

FIG. 6 shows a second embodiment of a stud hole protection 60 according to the invention. This stud hole protection is formed with a metal core, which is surrounded by a softer jacket 61. The jacket is cast around the metal core and is preferably formed from a polymeric material, for instance rubber. The jacket is formed with connector means 62 in the form of wings distributed around the stud hole protection. The number of wings is four in the embodiment illustrated but may also be three or five in other embodiments. In addition, embodiments wherein the connector means are entirely surrounding the hard metal core may be feasible, no individual wings being defined in such embodiments. The figure also shows that the stud hole core of metal of this embodiment is provided with a screw driver slot 63 or the like to be able to thread in and thread out, respectively, the stud hole protection 60 using an adapted tool.

Figure 7:
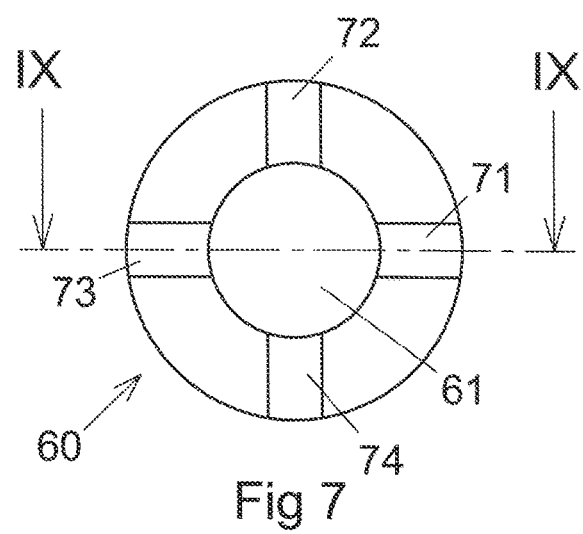
FIG. 7 shows the stud hole protection according to FIG. 6 from the under side.

FIG. 7 shows the stud hole protection 60 from the under side with the entirely surrounding jacket 61. The jacket is provided with indicated four wings 71, 72, 73, 74.

Figure 8:
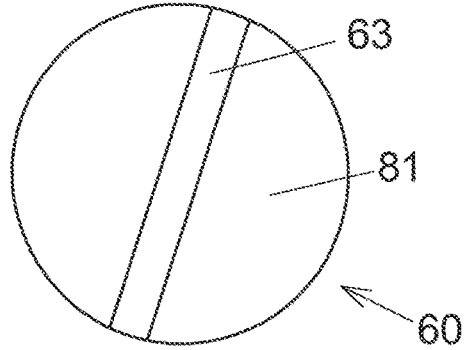
FIG. 8 shows the stud hole protection according to FIG. 6 from the upper side.

FIG. 8 shows the stud hole protection 60 from the upper side with the screw driver slot 63 in the stud hole core 81. The figure shows that the stud hole core 81 according to the embodiment at the screw driver slot side extends across the entire thread hole but that the screw driver slot side in other embodiments may be coated with the softer material to constitute a spacer between the metal of the horseshoe and the metal of the stud hole protection.

Figure 9:
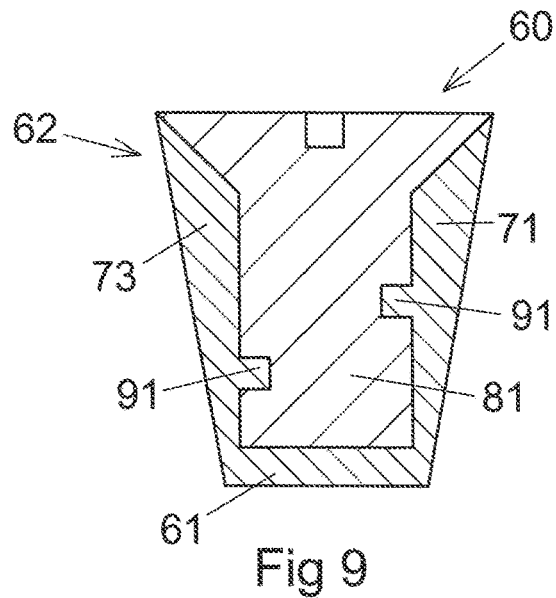
FIG. 9 shows a section IX-IX according to FIG. 7 through the stud hole protection.

FIG. 9 shows a centre section IX-IX according to FIG. 7 through the stud hole protection 60. The stud hole core 81 of metal is encased by the polymeric jacket 61 which at four spots along the circumference consists of thread connection elements 62 in the form of wings 72, 73. The jacket is cast into one or more recesses 91, in the figure two are shown, so that the soft jacket 61 should be retained at the stud hole core 81 upon axial load of the stud hole protection 60.

Figure 10:
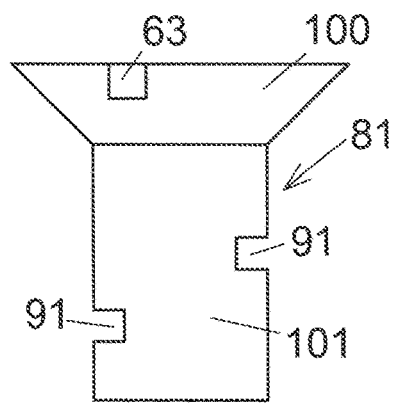
FIG. 10 shows the stud hole core according to the second embodiment of the stud hole protection.

FIG. 10 shows a side view of the stud hole core 81 provided with a top plate 100 in which the screw driver slot 63 is arranged and a cast-in body 101 in which the recesses 91 are placed.

Figure 11:
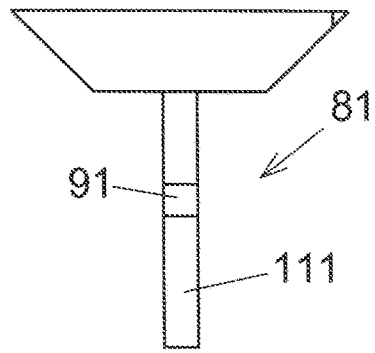
FIG. 11 shows the stud hole core according to FIG. 10 rotated a quarter turn.

FIG. 11 shows the stud hole core 81 rotated a quarter turn wherein it is seen that the stud hole core 81 is formed as a metal plate 111 in which the recesses 91 are arranged.

This second embodiment according to FIGS. 6-11 accordingly show a plate-shaped stud hole core, but it should be emphasized that also embodiments having cylindrical stud hole cores, which are provided with one or more circumferential grooves to clamp an encasement of a softer material, is comprised by the invention.

Even if FIGS. 2-11 show a cylindrical and a rectangular plate-shaped stud hole core, the invention also in the context of these shown embodiments stud is embodied by hole cores which are conical or plate-shapedly tapering. Such conical or tapering stud hole cores may be combined with thread connection elements that are inversely conical so as to together form a cylindrical stud hole protection which may be threaded into an existing stud hole thread.

Figure 12:
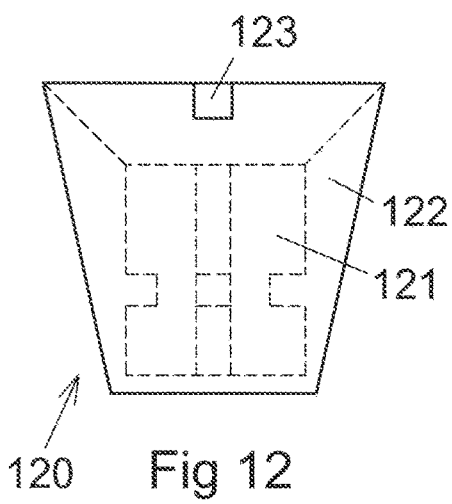
FIG. 12 shows a side view of a third embodiment of a stud hole protection according to the invention with hidden contour lines dashed.

FIG. 12 shows a third embodiment of a stud hole protection 120 according to the invention. Also this stud hole protection is formed with a metal core, which is surrounded by a softer jacket 121. The jacket is cast around and contains the entire metal core and may in modified embodiments be provided with external grooves between the bottom of the stud hole protection and the top thereof, not shown. The jacket is preferably formed from a polymeric material, for instance rubber. Thus, the entire jacket in this embodiment acts as a thread connection element 122 distributed around the stud hole protection and extends from the bottom of the stud hole core to the top thereof. The figure also shows that the stud hole core of metal of this embodiment is provided with a screw driver slot 123 or the like to be able to thread in and thread out, respectively, the stud hole protection 120 using an adapted tool.

Figure 13:
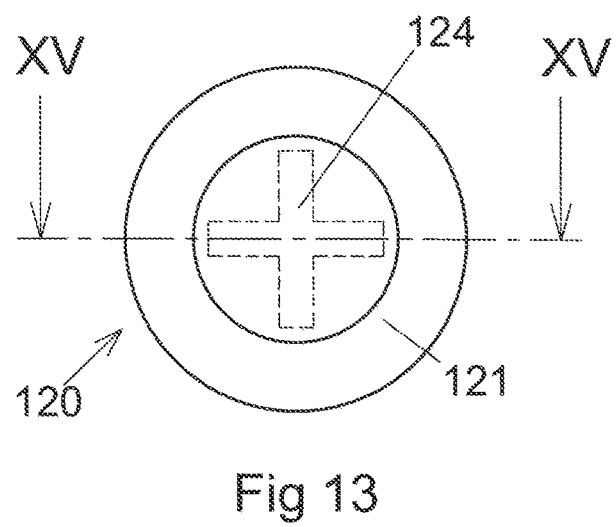
FIG. 13 shows the stud hole protection according to FIG. 12 from the under side with hidden contour lines dashed.

FIG. 13 shows the stud hole protection 120 from the under side with the entirely surrounding jacket 121 around a four-armed stud hole core 124, which has been indicated in the figure by dashed lines. As is seen in FIGS. 12 and 13, the jacket of the stud hole protection 120 is conical and rotationally symmetrically shaped.

Figure 14:
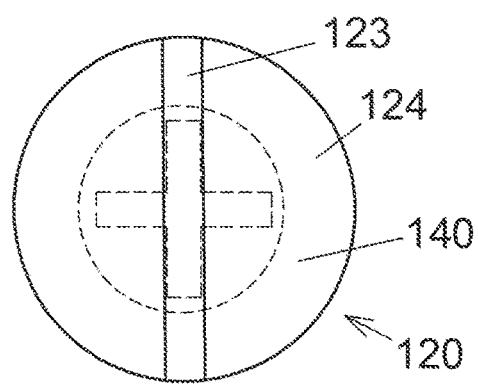
FIG. 14 shows the stud hole protection according to FIG. 12 from the upper side with hidden contour lines dashed.

FIG. 14 shows the stud hole protection 120 from the upper side with the screw driver slot 123 in the top 140 of the stud hole core 124. The figure shows that the stud hole core 124 according to the embodiment at the screw driver slot side extends across the entire thread hole. However, the screw driver slot side may in other embodiments be coated with the softer material to constitute a spacer between the metal of the horseshoe and the metal of the stud hole protection. Hidden lines of the stud hole core are shown in the figure by dashed lines.

Figure 15:
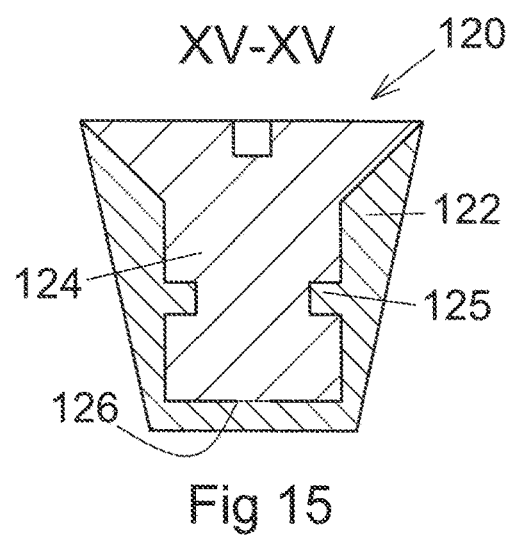
FIG. 15 shows a section XV-XV according to FIG. 13 through the stud hole protection.

FIG. 15 shows a centre section XV-XV according to FIG. 13 through the stud hole protection 120. The stud hole core 124 of metal is encased by the polymeric jacket 122. The jacket is cast into one or more recesses 125 in the stud hole core 124 so that the soft jacket 122 should be retained at the stud hole core 124 upon axial load of the stud hole protection 120. Also the bottom 126 of the stud hole core is encased by the polymeric jacket 122.

Figure 16:
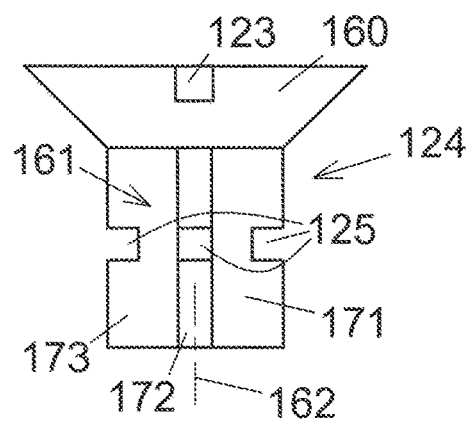
FIG. 16 shows the stud hole core according to the third embodiment of the stud hole protection.

FIG. 16 shows a side view of the stud hole core 124 of the stud hole protection provided with a top plate 160 in which the screw driver slot 123 is arranged. The stud hole core 124 is provided with a cast-in body 161 in which the recesses 125 are placed. Each recess is placed on a core wing 171, 172, 173, which wings are oriented perpendicularly to each other and extend radially out from the centre axis 162 of the cast-in body 161.

Figure 17:
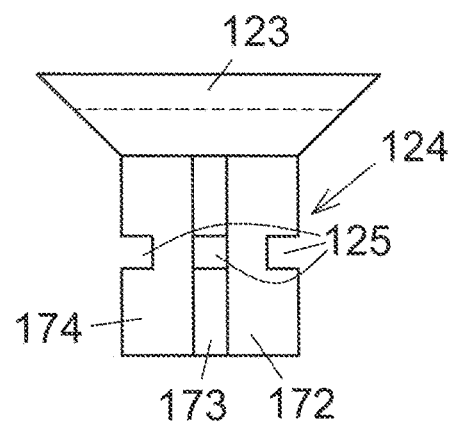
FIG. 17 shows the stud hole core according to FIG. 16 rotated a quarter turn.

FIG. 17 shows the stud hole core 124 rotated a quarter turn wherein it is seen that the stud hole core 124 is symmetrically shaped with the core wings 172, 173, 174 and the respective recess 125. The stud hole core is accordingly formed with four core wings which form a cross according to the indications in FIGS. 13-14. In the figure, the screw driver slot 123 is indicated by a dashed line.

Even if FIGS. 12-17 show a conical stud hole protection, also cylindrical stud hole protections may be conceivable within the scope of the invention. In the third embodiment shown, the recesses placed are on the same axial distance from the bottom of the stud hole core, but also other individually or pair wise differing distances are contained within the scope of the invention. The invention according to this third embodiment is also embodied by stud hole cores which are conical or plate-shapedly tapering. Such conical or tapering stud hole cores may be combined with thread connection elements that are inversely conical so as to together form a cylindrical stud hole protection which may be threaded into an existing stud hole thread. Also stud hole cores according to a modified third embodiment having three or five core wings are contained within the scope of the invention.

Even if the embodiments show a stud hole protection having a core of metal and a jacket of a polymer, the invention also comprises cores of hard polymers and jackets of soft polymers as long as the choices of materials of the stud hole protection have the effect that the core affords stability to the stud hole protection and the jacket affords a contact against the thread of the horseshoe by conforming to the same and that the materials engage each other.

By the embodiments shown, it is easy to conceive further embodiments wherein the core material and the surface material grip into each other by on one hand ring-shaped grooves to carry the axial forces and on the other hand axial grooves to carry the shearing forces upon, for instance, screwing and unscrewing of the stud hole protection.

The invention claimed is:

1. A stud hole protection to be inserted into a threaded stud hole in a horseshoe, the stud hole protection comprising:
   a stud hole core, and
   a thread connection element of a softer material than a material of the stud hole core, wherein the thread connection element is formed as a jacket which surrounds the stud hole core,
   wherein the thread connection element is configured to contact threading of the threaded stud hole in the horseshoe and prevent the material of the stud hole core from contacting the threading of the threaded stud hole in the horseshoe when the stud hole protection is mounted in the threaded stud hole in the horseshoe,
   wherein the softer material of the thread connection element extends from a bottom of the stud hole core to a top of the stud hole core.

2. The stud hole protection of claim 1, wherein the stud hole core is substantially cylindrical.

3. The stud hole protection of claim 1, wherein the stud hole core is of metal.

4. The stud hole protection of claim 1, wherein the thread connection element is of a polymeric material.

5. The stud hole protection of claim 1, wherein the stud hole core is provided with gripping means configured to clamp against the thread connection element.

6. The stud hole protection of claim 1, wherein the thread connection element is formed as a connector basket having a top ring connected to a bottom slab by a number of connecting elements.

7. The stud hole protection of claim 6, wherein the stud hole core is provided with grooves in which the connecting elements partly are inserted, so that the grooves are configured to act conveyingly on the connector basket upon mounting by screwing-in the stud hole protection.

8. The stud hole protection of claim 6, wherein the number of connecting elements is three.

9. The stud hole protection of claim 1, wherein the jacket comprises a number of integrated wings.

10. The stud hole protection of claim 9, wherein the number of integrated wings of the thread connection element is three.

11. The stud hole protection of claim 9, wherein the stud hole core is provided with three to five plate-shaped wings directed radially out from the center axis of the stud hole core and having edge-positioned recesses.

12. The stud hole protection of claim 11, wherein each plate-shaped wing is provided with only one edge-positioned recess.

13. The stud hole protection of claim 11, wherein at least two of the edge-positioned recesses are situated at an equal axial distance from the bottom of the stud hole core.

14. The stud hole protection of claim 1, wherein the stud hole core is plate-shaped with edge-positioned recesses.

15. The stud hole protection of claim 1, wherein the jacket encases the stud hole core.

* * * * *